Nov. 10, 1953   G. A. BRACE   2,658,442
ELECTRIC TOASTER

Filed Jan. 10, 1948   4 Sheets-Sheet 1

INVENTOR.
George A. Brace
BY
Harry S. Dumarre
ATTORNEY.

INVENTOR.
George A. Brace
BY
Harry S. Demarsh
ATTORNEY.

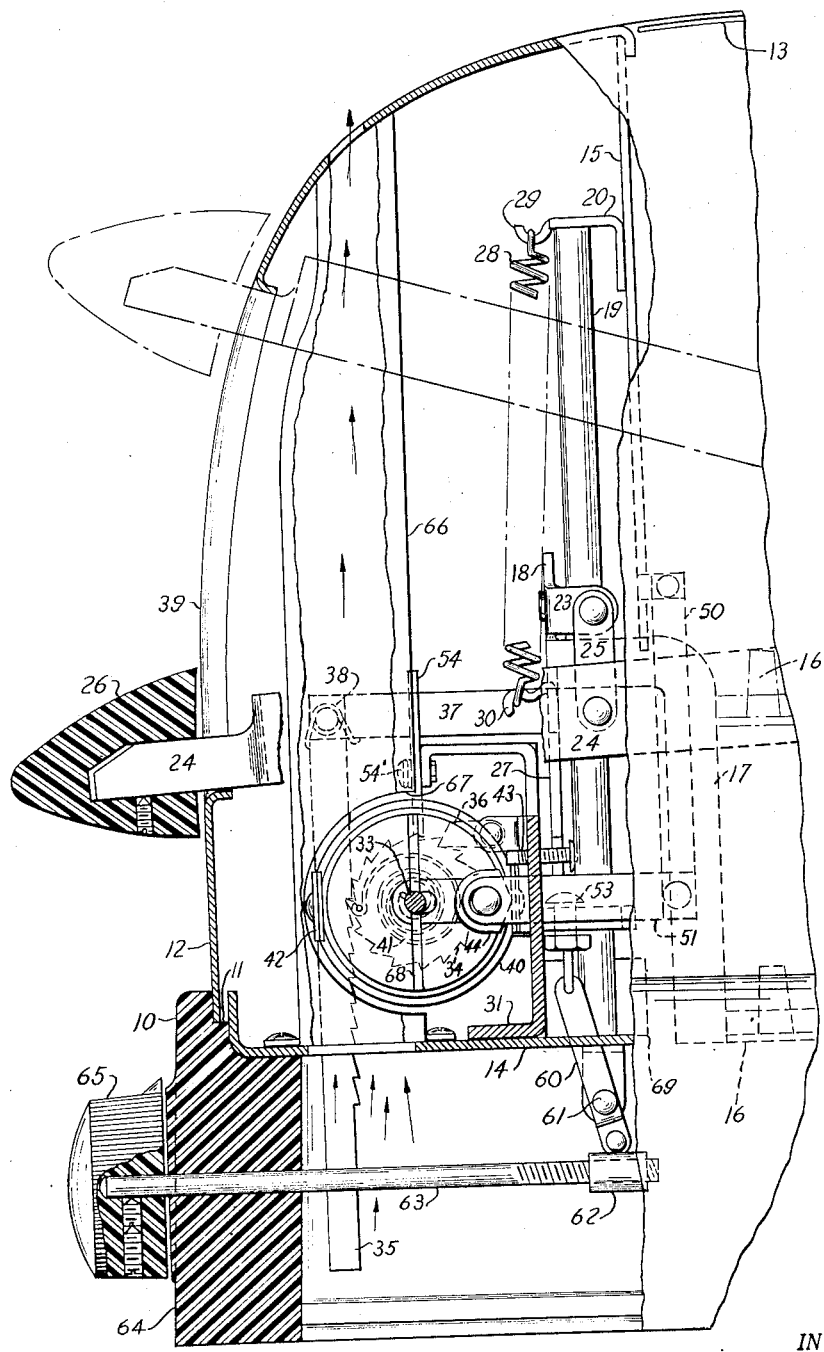

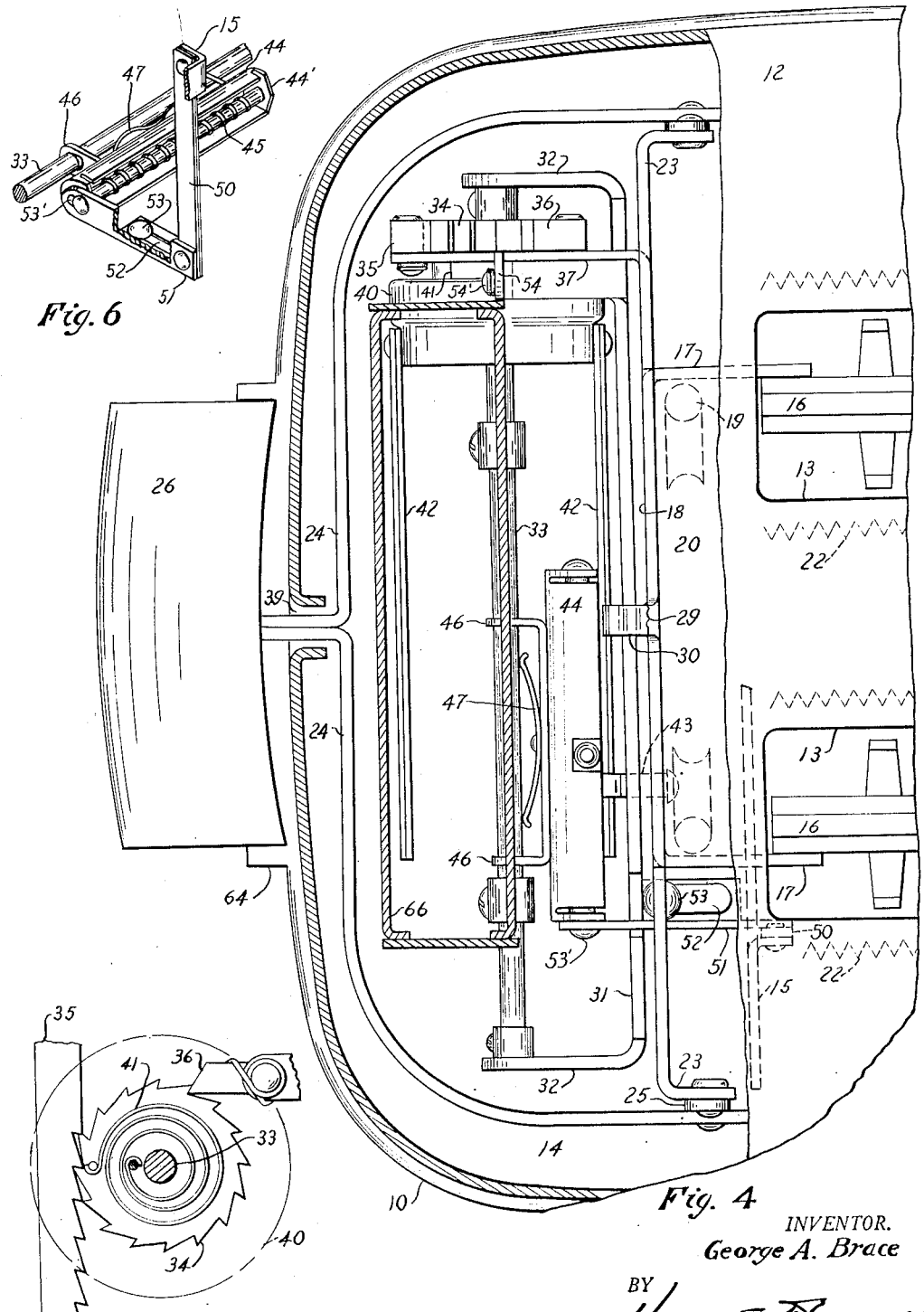

Patented Nov. 10, 1953

2,658,442

UNITED STATES PATENT OFFICE 2,658,442

ELECTRIC TOASTER

George A. Brace, Highland Park, Ill., assignor to The Hoover Company, North Canton, Ohio, a corporation of Ohio Application January 10, 1948, Serial No. 1,533

15 Claims. (Cl. 99—329)

This invention relates to toasters and more particularly to thermal timers for timing the duration of successive toasting intervals whereby toast of the desired color may be prepared regardless of the number of times the toaster is operated in rapid succession.

Thermal timers for timing the duration of succeeding toasting intervals are old in the art. However, prior art timers are usually made so that the timer moves relative to its heater laterally toward and away from the heater so that the distance between the timer and heater varies during the timed interval. This renders it difficult to design such timers for proper operation. It is a comparatively simple matter to calculate how much heat will be radiated from a heater to a thermally responsive element in a given time if the distance between the two remains fixed. However, when that distance varies over every instant of the time, the problem is not so simple. That is especially true when it is considered that the heat radiated from a hot body to a body removed therefrom varies inversely as the square of the distance between the two bodies.

In addition, in timers where the distance between the heater and the thermally responsive element varies during the timing interval, there are many variables some of which are cumulative so that, with modern mass production methods, one timer may time properly while the next one off the assembly line is entirely unsuitable.

According to the present invention the timer is so made that the distance between the thermally responsive element and its heater remains constant at all times during its timing interval. Thus, it is a simple matter to design a timer which will time properly and it is only necessary to hold production tolerances to a minimum at one point, namely, in the member which holds the thermally responsive element a fixed distance from its heater. This feature greatly facilitates the manufacture by modern mass production methods of a timer having highly superior operating characteristics and unusual uniformity.

According to another feature of this invention the duration of successive toasting intervals is adjustable both manually and thermostatically by moving the heater and the thermally responsive element lengthwise to one another to expose more or less of the length of the thermally responsive element to heat from the heater while maintaining the lateral distance between them constant.

More specifically according to this invention a compensating thermally responsive element is positioned in the toasting oven. The free end of the compensating thermally responsive element flexes in accordance with the temperature of the toasting oven to pivot an actuating link so as to move the auxiliary heater lengthwise and expose more or less of the thermally responsive element to its heat. The pivot point of the actuating link is also manually movable lengthwise of the link to vary the effect of the compensating bimetal whereby the timer may be adjusted for preparing light, medium, or dark toast.

According to another feature of this invention a plurality of thermally responsive elements are mounted for rotation on a rotatable drum. Movement of the bread carrier to toasting position stresses a spring tending to rotate the drum so as to move one thermally responsive element away from the auxiliary heater and another into a position to be heated thereby. The heating of the first thermally responsive element releases the spring so as to rotate the active thermally responsive element into a position to be cooled and the inactive thermally responsive element into heating position. The dynamic inertia of the rotating drum actuates the latch release lever to release the carrier for movement to receiving position.

Another object of this invention is to utilize the dynamic inertia of the thermal elements themselves as an aid in releasing the carriage latch.

Other objects and advantages of this invention will become apparent as the description proceeds when taken in connection with the accompanying drawings in which:

Figure 3 is a side plan view of the front of the toaster of Fig. 1 with the walls of the toaster broken away;

Figure 4 is a view of the front of the toaster of Fig. 1 looking downwardly with the top walls broken away to show the details;

Figure 5 is a detail view of a ratchet and rack bar for tensioning the winding spring; and Figure 6 is a detail view of the compensating means showing how the auxiliary heater is moved relative to the thermally responsive element to vary the timed intervals.

Figure 1:
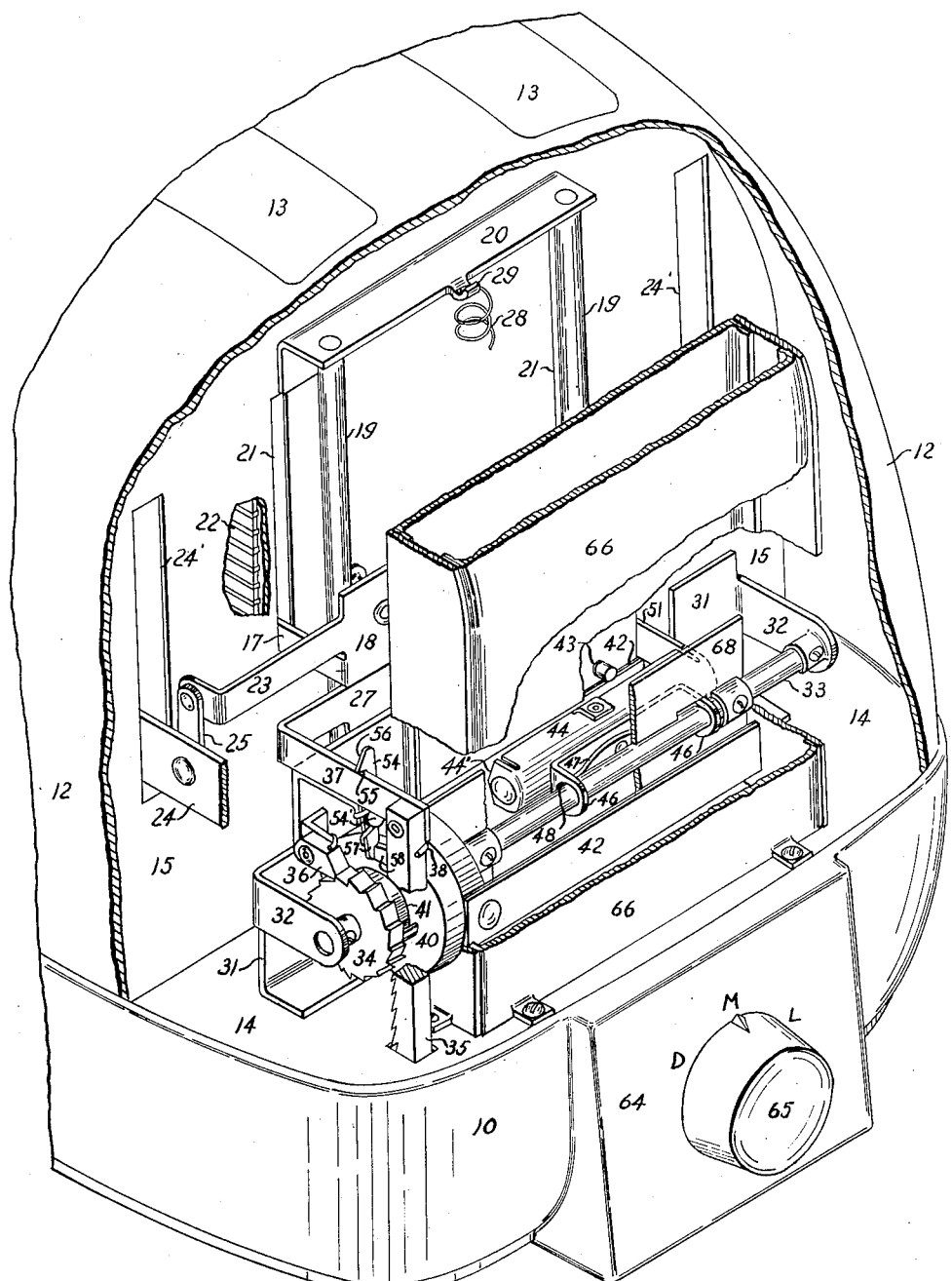
Figure 1 is a perspective view of the toaster and timer of this invention with the walls of the toaster broken away to better show the details of construction.

Referring to the drawings the reference numeral 10 represents a base for the toaster which may be made of a moldable material such as hard rubber, a phenolic condensation product or other such heat resisting insulating material. Mounted on a pheripheral ledge 11 of the base 10 is an appearance housing 12 having bread receiving slots 13 in its top. Supported by the base 10 inwardly of the ledge 11 is a supporting plate 14 which supports the entire mechanism within the appearance housing 12. A partition 15 divides the interior of the appearance housing 12 into a toasting oven and a mechanism compartment in a manner well known in the art.

Positioned beneath the slots 13 are bread carriers 16 secured at their forward ends by upwardly and forwardy extending arms 17 to a carriage plate 18 mounted for vertical reciprocation on a pair of vertically extending guide rods 19 rigidly secured at their lower ends to the supporting plate 14 and at their upper ends to the partition 15 by a bracket 20. The partition 15 is provided with slots 21 to provide for the vertical reciprocation of the arms 17. Main heaters 22 are positioned on opposite sides of each of the carriers 16.

Extending outwardly and rearwardly from the carriage plate 18 are a pair of arms 23. A pair of links 25 are pivoted at their upper ends to the rear ends of the arms 23 and at their lower ends to a pair of manipulating arms 24 which extend through slots 24' in partition 15 and are pivoted at their rear ends to the walls of the toasting oven in a manner well known in the art. At their forward ends, the arms 24 extend through a vertical slot 39 in the appearance housing 12 and have a manipulating handle 26 attached thereto exteriorly of the housing 12.

The carriage plate 18 normally rests by gravity on an auxiliary carriage plate 27 also guided for vertical reciprocation by the guide rods 19. The auxiliary carriage plate 27 is normally biased to upward position by a spring 28 anchored at its upper end to a hook 29 on the bracket 20 and at its lower end to a hook 30 struck forwardly from the upper edge of the auxiliary carriage plate 27.

Mounted on the supporting plate 14 is an upwardly extending bracket 31 having a pair of forwardly extending ears 32 which support a stationary shaft 33. Rotatable relative to the shaft 33 is a ratchet wheel 34 having teeth on its periphery to cooperate with teeth on a rack bar 35 and with the ratchet pawl 36. The pawl 36 is pivoted to the bracket 31 while the rack bar 35 is pivotally carried by a forwardly extending arm 37 on the auxiliary carriage plate 27. The rack bar 35 is spring-biased by a spring 38 so that its teeth normally engage the teeth of the ratchet wheel 34.

A drum 40 is also rotatably mounted on shaft 33 and is connected to the ratchet wheel 34 by means of a spiral spring 41 (Fig. 5) so that under certain conditions the spring 41 will rotate the drum 40 relative to the ratchet 34 and under other conditions the ratchet 34 may be rotated relative to the drum 40 to tension the spring 41. Attached at their ends to the periphery of drum 40 are a pair of similar bimetallic timing elements 42, the free ends of which flex toward shaft 33 when heated. An adjustable stop 43 is mounted on the bracket 31 and is adapted to engage over the upper edge of the active bimetallic element 42 for a purpose which fill presently appear.

Housed within and supported by a housing 44 is an auxiliary heater 45 (Fig. 6) which is adapted to heat the bimetallic timers 42. The housing 44 is supported from the shaft 33 by lugs 46 and is spring-biased radially outward by a spring 47. Slots 48 are provided in the lugs 46 to provide for relative radial movement between the lugs 46 and the shaft 33.

The outer ends of the lugs are bevelled as indicated so that they will not act as a detent preventing a thermal element rotating into a position directly opposite the heater. Housing 44 has an opening facing the active bimetallic timer 42. Spring 47 maintains the edges of the open face in contact with the active bimetallic element 42. As the active bimetal is heated it flexes inwardly and moves housing 44 toward the shaft 33. It is thus apparent that initially as well as continuously throughout the heating of the timer, the timer and heater move together and that the distance therebetween remains constant.

The slots 48 are of such length that timers 42 will just contact the bevelled edges 44' of the open edges of the housing 44 when they are in cold position so as to compress the springs 47 slightly for a purpose which will later become apparent.

The housing 44 and heater 45 are moved longitudinally of the shaft 33 to expose more or less of the active bimetallic timer 42 to the heat of the heater 45 by a compensating thermally responsive element 50 supported on the partition 15 inside the toasting oven. Referring to Fig. 6, the upper end of compensating bimetal element 50 is attached to the partition 15 and its lower end carries an actuating link 51 pivoted intermediate its ends by a slot 52 and a pin 53. The front end of the member 51 is attached to the housing 44 by a pin and slot connection 53'. This will permit axial and radial movement between the shaft 33 and the housing 44.

The pin 53 is movable forwardly and backwardly in the slot 52 by a link 60 (Fig. 3) pivoted to the supporting plate 14 at 61. The link 60 is connected at its lower end to a nut 62, threaded on the end of a shaft 63 extneding forwardly through a land 64 on the front of the base 10 and carries a manipulating knob 65 exteriorly of the base 10.

A carriage latch 54 is pivoted to the bracket 31 at 54' and is spring-biased counter-clockwise against a suitable stop as viewed in Fig. 1. The latch has a hook 55 and a cam 56 which cooperate with the arm 37 of auxiliary carrier 27 as will presently appear. The lower end 57 of the latch 54 cooperates with a pair of cams 58 on the end of the drum 40 in a manner to be explained hereinafter.

A cooling air flue 66 (Figs. 1 and 3) extends upwardly through the mechanism compartment and is positioned to house the inactive bimetallic element 42. The rear and side walls of the flue 66 are cut away at 67 to provide for the rotation of the bimetallic timers 42. A plate 68 forming a continuation of the rear wall of the flue 66 is attached to and remains stationary with the shaft 33. Sufficient clearance is provided between the plate 68 and the rear walls of the flue 66 to permit the free rotation of the bimetallic timers 42.

Figure 2:
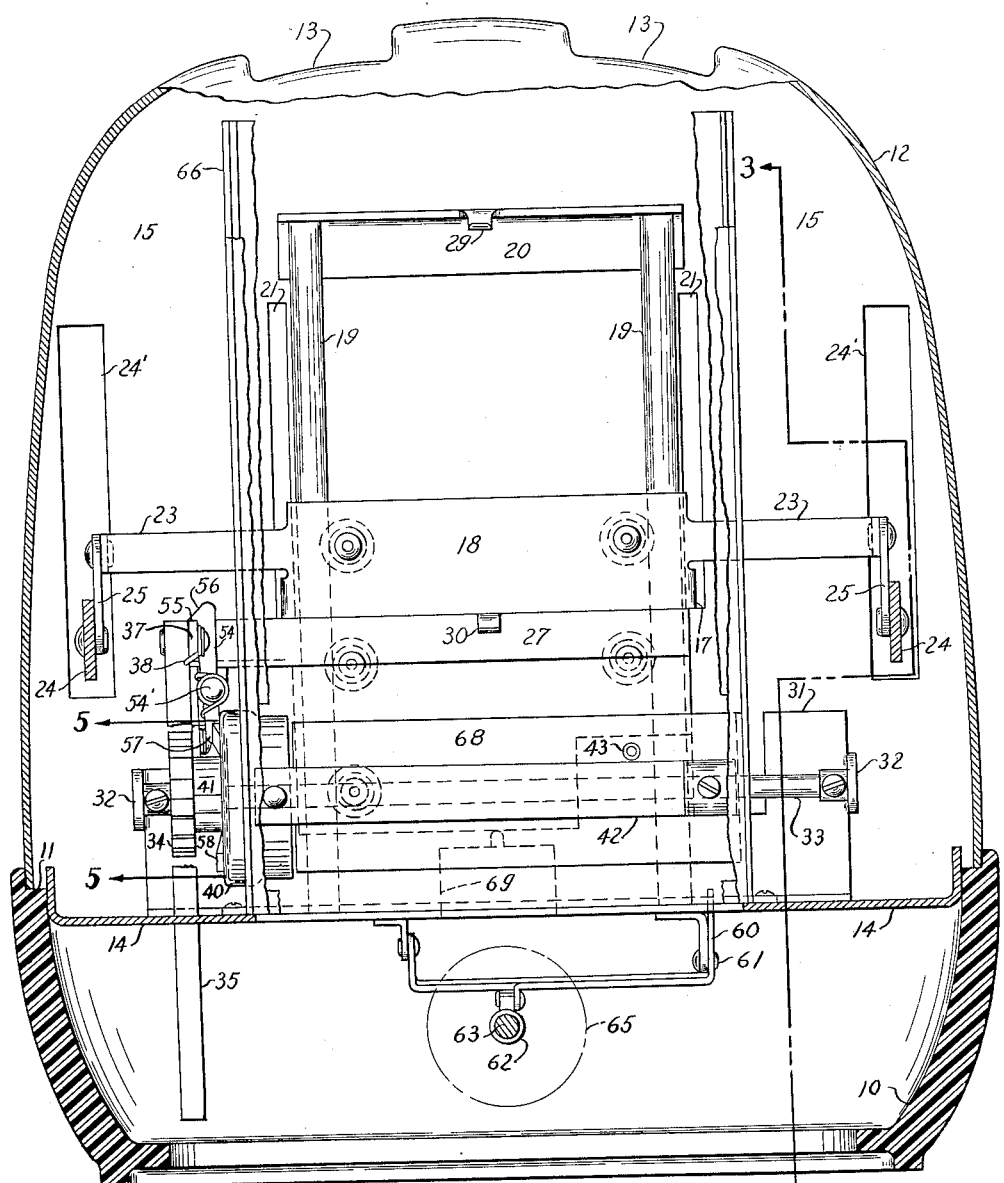
Figure 2 is a front plan view of the toaster of Fig. 1 with the front walls of the toaster broken away.

A switch 69 (Fig. 2) is carried by the supporting plate 14 below the auxiliary carriage plate 27 so that movement thereof to downward position will close the switch 69 and simultaneously energize the auxiliary heater 45 and the main heaters 22.

*Operation*

Bread is inserted through openings 13 so as to rest on bread carriers 16 and the manipulating handle 26 is moved to downward position. That will move the bread carriers 16 downward between the heaters 22 and close the switch 69 to energize the main heaters 22 and the auxiliary heater 45. The arm 37 will engage the cam 56 of the latch 54 and move the latch 54 clockwise so that its hook 55 will engage over the arm 37 and latch the carriage plate 27 downwardly against the bias of the spring 28.

Downward movement of the auxiliary carriage plate 27 will also cause downward movement of the rack bar 35 and rotate the ratchet wheel 34 to tension the spring 41 and bias the drum 40 for clockwise movement as viewed in Fig. 1. The ratchet wheel 34 will be held from reverse rotation by the pawl 36 and the drum 40 will be held from rotation under the bias of spring 41 by the stop 43 engaging over the free end of one of the bimetallic timers 42.

The main heaters will perform the toasting function and the auxiliary heater 45 will heat the adjacent bimetallic timer 42 by direct radiation and by reflection from the interior surface of the reflective housing 44. The bimetallic timers 42 are so made that upon being heated their free ends flex inwardly toward shaft 33. Due to the mounting employed for the heater, it also moves inwardly along with and at a fixed distance from the timer.

Eventually the free end of the active bimetallic timer 42 moves free of the stop 43 permitting the spiral spring 41 to rotate the drum 40 approximately 180 degrees clockwise to bring the inactive bimetallic timer 42 in front of the heater 45 and the active bimetallic timer 42 into the cooling flue 66.

The previously inactive bimetallic timer 42, being cold and parallel to the shaft 33, will contact the bevelled edges 44' and move the housing 44 inwardly against the bias of the spring 47 as it comes to rest against the stop 43. Further rotation of drum 40 is also arrested at the same time.

The momentum of rotating drum 40 causes one of the cams 58 to engage the tail end of the latch 54 with considerable force and moves the hook 55 from above the arm 37 releasing the auxiliary carriage plate 27, the carriage plate 18 and the bread carriers 16 for movement to receiving position under the bias of the spring 28. It is to be noted that the dynamic inertia of the mass comprising the drum 40 and the bimetallic timers is utilized in releasing the latch 54.

The cams 58 on the ends of the drum 40 are so positioned that after releasing the latch 54 they will clear the tail end 57 of the latch 54 before the previously inactive bimetallic timer 42 comes into contact with stop 43 permitting the lach to return to an engaging position with arm 37 when that arm is again moved downwardly.

The bimetallic timer 42 which was previously active will be moved into the cooling air flue 66 so as to be cooled and reconditioned for timing a succeeding toasting operation and the previously inactive bimetallic timer 42 will be moved into a position to time the following toasting operation.

During the first toasting operation the toasting oven is comparatively cold and requires a longer interval to toast bread than on subsequent cycles. At the start of the first toasting operation the housing 44 is so positioned that only a portion of the bimetallic timer 42 is exposed to the heat of the heater 45. As the toasting oven heats up the lower end of the compensating bimetal 50 flexes to the left as viewed in Fig. 6, pivoting the member 51 about the pin 53 and moving the housing 44 to the right (to the left as viewed in Fig. 1) to expose more of the bimetallic element 42 to the heat from the heater 45. However, at the end of the first toasting interval, a substantial portion of the heater projects beyond the end of the timer and out of heating relationship therewith. Hence, this portion of the heater is available for heating purposes in subsequent cycles when it is necessary to shorten the toasting intervals due to higher ambient toaster temperatures.

It is to be noted that the heater 45 is always positioned exactly the same lateral distance from the active bimetallic timer 42 so that the heat is always transmitted to the active bimetal 42 at the same rate per unit length of heater regardless of the position of the active bimetal. This is a distinct advantage over other thermal timers in which the timer moves laterally toward and away from the heater during its timing action so that the rate of heat transmitted to the timer varies during each instant of the timing interval. Since the quantity of heat radiated from a heat source to a body varies inversely as the square of the distance of the body from the source it will be realized that keeping the lateral distance between the timer and heater constant eliminates one of the major difficulties in the design and manufacture of toaster timers.

A second toasting operation may be initiated immediately after the first. The operation will be the same as that just described except that the compensating bimetal 50 will be hotter than for the first toasting operation. Its lower end will have moved further to the left as viewed in Fig. 6 so as to pivot the member 51 about the pin 53 and move the housing 44 and the heater 45 further to the left as viewed in Fig. 1 (to the right as viewed in Fig. 6) thus exposing more of the length of the heater 45 to the timer. Hence, it reaches its releasing position sooner. This shortens the toasting intervals sufficiently to take care of the faster toasting action of the toaster due to the residual heat acquired by the toaster during the previous toasting action.

The axial spacing of the heater wires along the length of the heater may be varied to vary the heat emitted per unit of length of the heater so that as the toaster heats up the toasting intervals will be progressively shortened to take care of the residual heat acquired by the toaster from previous toasting operations.

If the operator desires to produce dark toast the knob 65 is rotated to move the nut to the right as viewed in Fig. 3 and pivot the arm 60 counter-clockwise so as to move the pin 53 along the slot 52 to the position shown in Fig. 6. In this position, as the toasting oven heats up, the lower end of the compensating bimetal 50 will have to move further to move the housing 44 and heater 45 into greater heat exchange relationship to the timer 42. Stated differently, less of the length of the timing bimetal 42 is exposed to heater 45 and the toasting interval is prolonged to produce darker toast.

If light toast is desired the knob 65 is rotated in the opposite direction to move pin 53 toward the opposite end of the slot 52. Under these circumstances, the compensating bimetal 50 exposes a greater length of bimetallic timer 42 to heater 45 and shortens the toasting intervals to produce lighter toast.

If at any time during a toasting interval the operator desires to inspect the toast the handle 26 is merely raised upwardly to raise the carriers 16 independently of the timer and of the auxiliary carriage plate 27 to expose the upper edges of the slices through the openings 13.

It has been found in practice that ordinary thermal timers of the heat-up type have a tendency to over-compensate for the residual heat acquired by the toaster as a whole with rapid repeated use. However, that difficulty is remedied according to this invention by utilizing a plurality of timers, one of which is cooling while another is serving to time a toasting interval.

If desired, three or more timing bimetals may be positioned on the drum 40 in which case the drum 40 would have to travel three or four steps before making a complete revolution. Thus, either two or three of the timing bimetals would be in cooling position while the other is active, thus assuring sufficient time for each to be cooled and reconditioned for proper timing action before it is returned to an active position. In such a case cooling flue 66 may be omitted which would simplify the construction to that extent.

While I have shown but a single modification of my invention it is to be understood that that modification is to be taken as illustrative only and not in a limiting sense. I do not wish to be limited to the specific structure shown and described but to include all equivalent variations thereof except as limited by the scope of the claims.

I claim:

1. In a toaster, main heating means for performing the toasting function, a thermal timer for timing the duration of successive toasting intervals, a heater for said timer, means for energizing said heater and said main heating means to initiate a toasting interval, said timer including a thermally responsive element of the laterally deflecting type operable upon being heated to terminate the toasting intervals, said heater being mounted in spaced heat radiating relationship to said thermally responsive element and for movement lengthwise thereof and means for moving said heater along the length of said thermally responsive element to expose more or less of the length of said thermally responsive element to the heat of said heater for varying the duration of toasting intervals.

2. In a toaster according to claim 1 in which said last mentioned means includes means responsive to variations in toaster temperature for moving said heater lengthwise of said thermally responsive element for varying the duration of toasting intervals with variations in toaster temperature.

3. In a toaster according to claim 1 in which said last mentioned means includes manually actuatable means for moving said heater lengthwise of said thermally responsive element for varying the duration of toasting intervals in adjusting said timer for preparing light, medium, or dark toast.

4. In a toaster according to claim 1 in which said last mentioned means includes manually actuatable means and means responsive to variations in toaster temperature for moving said heater lengthwise of said thermally responsive element for varying the duration of successive toasting intervals with variations in toaster temperature and for varying the duration of toasting intervals in adjusting said toaster for preparing light, medium, or dark toast.

5. In a toaster, main heating means for performing the toasting function, a thermal timer for timing the duration of successive toasting intervals, a heater for said timer, said timer including a thermally responsive element, means for energizing said main heating means and said heater to initiate toasting intervals, means actuated by movement of said thermally responsive element upon being heated for terminating toasting intervals, said heater being movable along the length of said thermally responsive element to expose more or less of the length of said thermally responsive element to the heat of said heater, a pivoted link for moving said heater lengthwise of said thermally responsive element, compensating thermally responsive means responsive to variations in toaster temperature for operating said link and manually actuatable means for moving the pivot point of said link for manually varying the distance said heater is moved lengthwise of said thermally responsive element by said compensating thermally responsive element.

6. In a toaster, main heating means for performing the toasting function, a thermal timer for timing the duration of successive toasting intervals, a heater for said timer, said timer including a thermally responsive element, said heater being mounted in spaced heat radiating relationship to said thermally responsive element and for movement along the length thereof to expose more or less of the length of said thermally responsive element to the heat of said heater, means for energizing said main heating means and said heater to initate toasting intervals, means actuated by movement of said thermally responsive element upon being heated for terminating toasting intervals, a pivoted link for moving said heater lengthwise of said thermally responsive element and means for actuating said link.

7. In a toaster according to claim 6 including means for changing the pivot point of said link so as to vary the action of said actuating means in moving said heater along the length of said thermally responsive element.

8. In a toaster according to claim 6 in which said actuating means comprises means responsive to changes in toaster temperature.

9. In a toaster according to claim 6 in which said actuating means comprises thermally responsive means responsive to changes in toaster temperature and manually actuatable means for changing the pivot point of said link so as to vary the action of said thermally responsive means in moving said heater along the length of said thermally responsive element.

10. A timer comprising, a base, a drum mounted on said base for rotation on a horizontal axis, a plurality of bimetallic timers rigidly attached at one end to said drum and being spaced peripherally about said drum, said bimetallic timers lying in spaced parallel relationship to the axis of said drum when cold and having free ends movable inwardly toward the axis of said drum upon being heated, spring means for biasing said drum for rotation about its axis, a stop engageable with the free end of one of said bimetallic timers when in its cold position for preventing rotation of said drum, a heater positioned interiorly of the free ends of said bimetallic timers in a position to heat said one bimetallic timer, means carried by said heater for contacting said one bimetallic timer for spacing said heater a definite distance inwardly of said one bimetallic timer, yielding means for holding said contacting means in contact with said one bimetallic timer as it flexes inwardly upon being heated, the arrangement being such that upon being heated the free end of said one bimetallic timer will flex inwardly and move said heater inwardly against the action of said yielding means so as to maintain said heater a definite distance inwardly of said one bimetallic timer as it moves inwardly until the free end of said one bimetallic timer moves free of said stop whereby said spring means will rotate said drum to bring the free end of a second of said bimetallic timers into contact with said stop and into contact with said contacting means to position said heater a definite distance therefrom.

11. In a toaster, a base, a drum rotatably mounted on said base for rotation about a horizontal axis, a plurality of cylindrically arranged peripherally spaced bimetallic timers carried by said drum, the free ends of said bimetallic timers being movable inwardly toward said horizontal axis upon being heated, a stop for engaging the free end of one of said bimetallic timers when in its cold position, a ratchet wheel mounted for rotation on said horizontal axis, a spiral spring connecting said ratchet wheel to said drum, a heater for said timers, means for energizing said heater, means actuated by movement of said energizing means to its energizing position for rotating said ratchet wheel to tension said spring while said drum is held from rotation by engagement of the free end of said one bimetallic timer with said stop and means for preventing reverse rotation of said ratchet wheel under the bias of said spring whereby when said bimetallic timer is heated its free end will move from engagement with said stop and said spring will rotate said drum to bring a second of said bimetallic timers into engagement with said stop.

12. In a toaster according to claim 11 including a latch for holding said energizing means in its energizing position, and means actuated by rotation of said drum and utilizing the dynamic inertia of said drum and bimetallic timers for releasing said latch.

13. In a toaster, main heating means for performing the toasting function, a thermal timer for timing the duration of successive toasting intervals, said timer including a thermally responsive element of the laterally deflecting type, a heater for said timer positioned in laterally spaced non-heat conductive relationship to said thermally responsive element so as to radiate heat thereto, said heater being mounted for movement with said thermally responsive element as it deflects laterally, stop means for maintaining the lateral distance between said heater and said thermally responsive element constant during the timing action of said timer, means for energizing said main heating means and said heater, means operable by the lateral deflection of said thermally responsive element upon being heated for terminating the toasting interval, and means responsive to toaster temperature for moving said heater along the length of said thermally responsive element to expose more or less of the length of said thermally responsive element to the heat of said heater while maintaining the lateral distance between said heater and thermally responsive element constant so as to vary the duration of successive toasting intervals with variations in toaster temperature.

14. In a toaster, main heating means for performing the toasting function, a thermal timer for timing the duration of successive toasting intervals, said timer including a thermally responsive element of the laterally deflecting type, a heater for said timer positioned in laterally spaced non-heat conductive relationship to said thermally responsive element so as to radiate heat thereto, said heater being mounted for movement with said thermally responsive element as it deflects laterally, stop means for maintaining the lateral distance between said heater and said thermally responsive element constant during the timing action of said timer, means for energizing said main heating means and said heater, means operable by the lateral deflection of said thermally responsive element upon being heated for terminating the toasting interval, and manually actuatable means for moving said heater along the length of said thermally responsive element to expose more or less of the length of said thermally responsive element to the heat of said heater while maintaining the lateral distance between said heater and thermally responsive element constant so as to vary the duration of toasting intervals in adjusting for light, medium, or dark toast.

15. In a toaster, main heating means for performing the toasting function, a thermal timer for timing the duration of successive toasting intervals, said timer including a thermally responsive element of the laterally deflecting type, a heater for said timer positioned in laterally spaced non-heat conductive relationship to said thermally responsive element so as to radiate heat thereto, said heater being mounted for movement with said thermally responsive element as it deflects laterally, stop means for maintaining the lateral distance between said heater and said thermally responsive element constant during the timing action of said timer, means for energizing said main heating means and said heater, means operable by the lateral deflection of said thermally responsive element upon being heated for terminating the toasting interval, and manually actuatable means superimposed upon means responsive to toaster temperature for moving said heater along the length of said thermally responsive element to expose more or less of the length of said thermally responsive element to the heat of said heater while retaining the lateral distance between said heater and thermally responsive element constant to thereby vary the duration of toasting intervals thermostatically responsive to changes in toaster temperature and manually for adjusting said timer for preparing light, medium, or dark toast.

GEORGE A. BRACE.

References Cited in the file of this patent

UNITED STATES PATENTS

| Number | Name | Date |
|---|---|---|
| 1,649,506 | Brewer | Nov. 15, 1927 |
| 1,871,262 | Ellingson | Aug. 9, 1932 |
| 1,908,683 | Browning | May 16, 1933 |
| 1,988,230 | Avery | Jan. 15, 1935 |
| 2,031,656 | Jeppsson | Feb. 25, 1936 |
| 2,106,269 | Brosseau et al. | Jan. 25, 1938 |
| 2,132,622 | Ireland | Oct. 11, 1938 |
| 2,250,439 | Persons | July 22, 1941 |
| 2,254,687 | Koci | Sept. 2, 1941 |
| 2,258,156 | Gomersall | June 2, 1942 |
| 2,302,117 | Gomersall | Nov. 17, 1942 |
| 2,331,737 | Scoggin | Oct. 12, 1943 |
| 2,336,640 | Sardeson | Dec. 14, 1943 |
| 2,373,103 | Duebel | Apr. 10, 1945 |
| 2,436,735 | Walder et al. | Feb. 24, 1948 |
| 2,439,017 | Meyers | Apr. 6, 1948 |
| 2,487,154 | Lloyd | Nov. 8, 1949 |
| 2,508,464 | McCullough | May 23, 1950 |
| 2,545,288 | Kuhn et al. | Mar. 13, 1951 |

FOREIGN PATENTS

| Number | Country | Date |
|---|---|---|
| 464,861 | Great Britain | Apr. 19, 1937 |